Patented July 14, 1953

2,645,637

UNITED STATES PATENT OFFICE 2,645,637

SYNTHESIS OF ADENOSINE-5'-TRIPHOSPHATE

Alexander Robertus Todd and Adolf Michael Michelson, Cambridge, England, assignors to National Research Development Corporation, London, England No Drawing. Application July 28, 1950, Serial No. 176,554. In Great Britain July 20, 1949

3 Claims. (Cl. 260—211.5)

The present invention is concerned with the manufacture of adenosine-5'-triphosphate which has the formula:

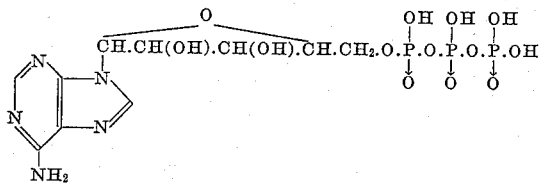

This adenosine triphosphate which was first isolated from muscle extracts in 1929 (Lohmann, Naturwiss., 1929, 17, 624; Fiske and Subbarow, Science, 1929, 70, 381) plays a vital part in many biological processes and, according to current views, provides the energy used in muscular contractions. It finds use in clinical medicine.

Adenosine-5'-triphosphate has hitherto been synthesised from adenosine. The route followed in this synthesis comprised the phosphorylation of adenosine, in which the hydroxyl groups in the 2' and 3' positions of the ribofuranoside chain are protected by an isopropylidene group, with dibenzyl chlorophosphonate, hydrolysing off the isopropylidene group and one benzyl group from 2':3'-isopropylidene-adenosine-5'-dibenzylphosphate so formed, condensing the resulting adenosine-5'-benzylphosphate in the form of its silver salt with dibenzyl chlorophosphonate to form tri-benzyl adenosine-5'-di-phosphate, removing one benzyl group from the latter by treatment with N-methyl-morpholine and condensing the resulting dibenzyl adenosine-5'-di-phosphate in the form of its silver salt with di-benzyl chlorophosphonate followed by removal of the benzyl groups from the tetra-benzyl adenosine-5'-triphosphate thus formed. The various stages of this synthesis are described in British specifications Nos. 621,094 and 11,418/48.

The present invention is based on the discovery that in the course of attempts to synthesise adenosine triphosphate of the following formula:

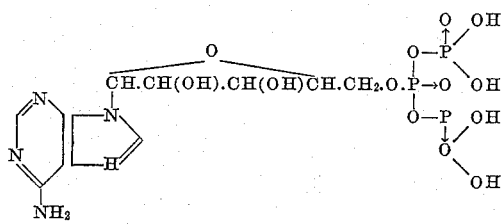

by a process involving preparation of its tetra-benzyl ester, followed by removal of the benzyl residues, a facile rearrangement occurs to give its naturally occurring isomer.

The invention consists in a process for the manufacture of adenosine-5'-triphosphate which comprises condensing dibenzyl chlorophosphonate with the di-silver salt of adenosine-5'-phosphate and removing the benzyl groups of the resulting tetra-benzyl adenosine-5'-triphosphate by hydrogenation.

The product of the present invention is conveniently obtainable in the form of its barium salt. This salt may, if necessary, be converted into salts with other metals or with organic bases.

The following example is illustrative of the present invention:

To a solution of di-silver adenosine-5'-phosphate (2 g. dried for 12 hours at 80°/1 mm.) in phenol (90 g.) at 60° C. dibenzyl chlorophosphonate (prepared from 5 g. dibenzyl phosphite, according to Atherton, Openshaw and Todd, J., 1945, 382) and acetonitrile (10 cc.) were added. The mixture was maintained at 60° C. for 5 minutes with exclusion of moisture and then poured into dry ether (500 cc.). The precipitated solid was filtered off, washed well with ether, dried under reduced pressure at room temperature and dissolved in aqueous dioxan (200 cc. of 50%). Silver chloride was removed by filtration through Hyflo supercel and the solution hydrogenated at room temperature and atmospheric pressure in the presence of a mixture of palladium oxide and palladised cargon catalysts. After absorption of hydrogen had ceased, the catalyst was removed by filtration and sodium hydroxide (N) and barium acetate solution added to pH 6.5. The precipitated barium salt was centrifuged off, washed with water, dissolved in cold hydrochloric acid (N/10), centrifuged from insoluble matter and sodium hydroxide solution (N) added to pH 5. The collected barium salt was again dissolved in cold hydrochloric acid (N/10) and the barium salt reprecipitated by adding two volumes of absolute ethanol. Water, barium acetate (20%) and sodium hydroxide solution (N) were added to the collected barium salt (which contained a certain amount of acidic monobarium adenosine triphosphate) to pH 6.5 and the barium salt centrifuged off, washed twice with water, once with 50% ethanol, twice with 95% ethanol, once with ether, and dried under reduced pressure at room temperature over phosphoric oxide (yield, 1.5 g.).

Enzymic assay indicated ca. 30% inorganic pyrophosphate and 40–45% (slight variation in successive runs) of an adenosine triphosphate split by myosin adenosine-triphosphatase.

We claim:

1. A process for the manufacture of straight chain adenosine-5'-triphosphate which comprises condensing dibenzyl chlorophosphonate with the di-silver salt of adenosine-5'-phosphate to effect direct phosphorylation of the latter, and subsequently removing the benzyl groups of the resulting tetra-benzyl adenosine-5'-triphosphate by hydrogenation.

2. A process for the manufacture of straight chain adenosine-5'-triphosphate which comprises the steps of condensing dibenzyl chlorophosphonate with the di-silver salt of adenosine-5'-phosphate to effect direct phosphorylation of the latter, hydrogenating the resulting tetra-benzyl adenosine-5'-triphosphate to remove the benzyl groups and precipitating the adenosine-5'-triphosphate thus formed as a barium salt.

3. A process for the manufacture of straight chain adenosine-5'-triphosphate which comprises adding dibenzyl chlorophosphonate and acetonitrile to a solution of di-silver adenosine-5'-phosphate, maintaining the mixture with exclusion of moisture at 60° C. for a few minutes to effect direct phosphorylation of the di-silver phosphate, pouring the mixture into dry ether, filtering off the precipitated solid, dissolving the precipitated solid in dioxan, removing silver chloride from the last mentioned solution, catalytically hydrogenating the resultant solution, removing the catalyst and adding sodium hydroxide and barium acetate solution to pH 6.5 to precipitate the barium salt of adenosine-5'-triphosphate.

ALEXANDER ROBERTUS TODD.
ADOLF MICHAEL MICHELSON.

References Cited in the file of this patent

UNITED STATES PATENTS

| Number | Name | Date |
|---|---|---|
| 1,978,881 | Lautenschlager et al. | Oct. 30, 1934 |

OTHER REFERENCES

Baddiley et al., Nature, 1948, pages 761–762.

Baddiley et al., J. Chem. Soc. (London), pages 648–651 (1947).

Atherton et al., J. Chem. Soc., pages 382–385 (1945).